United States Patent
Dawson et al.

(10) Patent No.: US 10,574,953 B2
(45) Date of Patent: Feb. 25, 2020

(54) TRANSPARENT GLASS OF POLYMER WINDOW PANE AS A PROJECTOR SCREEN

(71) Applicant: Sony Corporation, Tokyo (JP)

(72) Inventors: Thomas Dawson, Escondido, CA (US); Steven Richman, San Diego, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 15/602,796

(22) Filed: May 23, 2017

(65) Prior Publication Data

US 2018/0343427 A1  Nov. 29, 2018

(51) Int. Cl.
*G03B 21/62* (2014.01)
*H04N 9/31* (2006.01)
*G03B 21/625* (2014.01)

(52) U.S. Cl.
CPC ......... *H04N 9/3185* (2013.01); *G03B 21/625* (2013.01)

(58) Field of Classification Search
CPC .. H04N 9/3185; H04N 9/7904; G02F 1/1333; G03B 21/625
USPC ........................................................ 359/460
See application file for complete search history.

(56) References Cited

U.S. PATENT DOCUMENTS

| | | | |
|---|---|---|---|
| 2,281,101 A | 4/1942 | Land | |
| 2,740,954 A | 4/1956 | Georges | |
| 3,510,197 A | 5/1970 | Seki et al. | |
| 3,961,839 A | 6/1976 | Brobst | |
| 5,111,337 A | 5/1992 | Martinez | |
| 5,218,472 A | 6/1993 | Jozefowicz et al. | |
| 5,361,164 A | 11/1994 | Steliga | |
| 5,530,571 A * | 6/1996 | Chen | G02B 6/0051 349/112 |
| 5,625,489 A | 4/1997 | Glenn | |
| 5,764,248 A | 6/1998 | Scarpetti | |

(Continued)

FOREIGN PATENT DOCUMENTS

| | | |
|---|---|---|
| EP | 0421809 A2 | 4/1991 |
| GB | 624772 A | 6/1949 |

(Continued)

OTHER PUBLICATIONS

Thomas Dawson, Steven Richman, "Multichromic Filtering Layer to Enhance Screen Gain", related U.S. Appl. No. 15/656,691, Non-Final Office Action dated Jun. 12, 2018.

(Continued)

*Primary Examiner* — Stephone B Allen
*Assistant Examiner* — Jyotsna V Dabbi
(74) *Attorney, Agent, or Firm* — John L. Rogitz

(57) ABSTRACT

A glass (or other transparent) substrate such as a window is used for large screen video projection to permit viewing at an outdoor location (or opposite side of the substrate) of a video projector's image directed from a location in the home. The projector image is sent through an articulated glass window pane (substrate). Alternately a projector such as an ultra short throw (UST) projector can be completely located behind the transparent glass pane located in a home separating two rooms. In either case, the video image can be projected onto the substrate when desired, and when no video is being shown the substrate functions as a window or displays window art as a wall covering.

5 Claims, 5 Drawing Sheets

(56) References Cited

U.S. PATENT DOCUMENTS

| | | | |
|---|---|---|---|
| 5,777,720 A | 7/1998 | Shapiro et al. | |
| 5,903,328 A | 5/1999 | Greene et al. | |
| 6,013,123 A | 1/2000 | Scarpetti | |
| 6,208,325 B1* | 3/2001 | Reddy | G06F 3/1431 345/656 |
| 6,301,051 B1 | 10/2001 | Sankur | |
| 6,337,769 B1 | 1/2002 | Lee | |
| 6,529,322 B1 | 3/2003 | Jones et al. | |
| 6,530,664 B2 | 3/2003 | Vanderwerf et al. | |
| 6,842,282 B2 | 1/2005 | Kuroda et al. | |
| 6,892,949 B2 | 5/2005 | Mondie | |
| 7,072,108 B2 | 7/2006 | Cruz-Uribe et al. | |
| 7,130,118 B2 | 10/2006 | Smythe et al. | |
| 7,248,406 B2 | 7/2007 | May et al. | |
| 7,384,158 B2 | 6/2008 | Ramachandran et al. | |
| 7,480,096 B2 | 1/2009 | May et al. | |
| 7,535,636 B2 | 5/2009 | Lippey et al. | |
| 7,538,942 B2 | 5/2009 | Odagiri et al. | |
| 7,545,397 B2 | 6/2009 | O'Dea et al. | |
| 7,614,750 B2 | 11/2009 | May et al. | |
| 7,661,828 B2 | 2/2010 | Allen et al. | |
| 7,733,310 B2 | 6/2010 | Hajjar et al. | |
| 7,911,693 B2 | 3/2011 | Smith et al. | |
| 7,936,507 B2 | 5/2011 | Sano et al. | |
| 7,974,005 B2 | 7/2011 | Huibers et al. | |
| 8,081,368 B2 | 12/2011 | Lippey | |
| 8,218,236 B2 | 7/2012 | Shiau et al. | |
| 8,284,487 B1 | 10/2012 | Liu | |
| 8,411,983 B2 | 4/2013 | Wei | |
| 8,469,519 B2 | 6/2013 | Marcus et al. | |
| 8,649,090 B2 | 2/2014 | Hosoi | |
| 8,913,000 B2 | 12/2014 | Erol et al. | |
| 9,412,318 B2 | 8/2016 | Chang | |
| 9,640,143 B1 | 5/2017 | Dawson et al. | |
| 9,792,847 B2 | 10/2017 | Dawson et al. | |
| 2001/0035927 A1 | 11/2001 | Sasagawa et al. | |
| 2003/0147053 A1 | 8/2003 | Matsuda et al. | |
| 2004/0257649 A1* | 12/2004 | Heikkila | G03B 21/56 359/443 |
| 2005/0128581 A1 | 6/2005 | Samuels et al. | |
| 2006/0038962 A1 | 2/2006 | Matsumoto et al. | |
| 2006/0061860 A1 | 3/2006 | Devos et al. | |
| 2006/0209213 A1 | 9/2006 | Baker | |
| 2006/0228523 A1 | 10/2006 | Cronin | |
| 2006/0279839 A1 | 12/2006 | May et al. | |
| 2007/0014318 A1 | 1/2007 | Hajjar et al. | |
| 2007/0040989 A1 | 2/2007 | Weng et al. | |
| 2007/0133088 A1 | 6/2007 | Lippey et al. | |
| 2007/0177063 A1 | 8/2007 | Hiramatsu | |
| 2007/0211227 A1 | 9/2007 | Era | |
| 2008/0100564 A1 | 5/2008 | Vincent et al. | |
| 2008/0144172 A1 | 6/2008 | Sano et al. | |
| 2008/0239497 A1 | 10/2008 | Lippey | |
| 2008/0304014 A1 | 12/2008 | Vaan | |
| 2009/0086296 A1 | 4/2009 | Renaud-Goud | |
| 2009/0091718 A1 | 4/2009 | Obi et al. | |
| 2010/0097699 A1 | 4/2010 | Destain et al. | |
| 2010/0207956 A1 | 8/2010 | Keh et al. | |
| 2010/0245995 A1 | 9/2010 | Graetz et al. | |
| 2011/0019914 A1 | 1/2011 | Bimber et al. | |
| 2011/0075114 A1 | 3/2011 | Tanis-Likkel et al. | |
| 2011/0179734 A1 | 7/2011 | Shaffer | |
| 2012/0223879 A1 | 9/2012 | Winter | |
| 2013/0033530 A1 | 2/2013 | Gamache et al. | |
| 2014/0028594 A1 | 1/2014 | Chen et al. | |
| 2014/0104297 A1 | 4/2014 | Yang | |
| 2014/0168288 A1 | 6/2014 | Tusch | |
| 2014/0354698 A1 | 12/2014 | Lee et al. | |
| 2015/0077849 A1 | 3/2015 | Sadahiro et al. | |
| 2015/0138627 A1 | 5/2015 | Ehrensperger et al. | |
| 2015/0309316 A1 | 10/2015 | Osterhout et al. | |
| 2015/0346592 A1 | 12/2015 | Corey et al. | |
| 2016/0088275 A1* | 3/2016 | Fuchikami | G03B 21/14 348/744 |
| 2016/0243773 A1* | 8/2016 | Wang | B29D 11/0073 |
| 2016/0366379 A1 | 12/2016 | Hickl | |
| 2017/0032728 A1 | 2/2017 | Shima et al. | |
| 2017/0075207 A1 | 3/2017 | Tao et al. | |
| 2017/0269360 A1 | 9/2017 | Yamaguchi et al. | |
| 2019/0283673 A1 | 9/2019 | Kamer et al. | |
| 2019/0285878 A1 | 9/2019 | Hansen et al. | |

FOREIGN PATENT DOCUMENTS

| | | |
|---|---|---|
| JP | 109274159 A | 10/1997 |
| JP | 2002097730 A | 4/2002 |
| JP | 2008032925 A | 2/2008 |
| KR | 1020160103460 A | 9/2016 |

OTHER PUBLICATIONS

Thomas Dawson, Steven Richman, "Multichromic Filtering Layer to Enhance Screen Gain", related U.S. Appl. No. 15/656,691, Applicant's response to Non-Final Office Action filed Jun. 14, 2018.

Thomas Dawson, Steven Richman, "Microfaceted Projection Screen", related U.S. Appl. No. 15/615,523, Non-Final Office Action dated Sep. 27, 2018.

Thomas Dawson, Steven Richman, "Microfaceted Projection Screen", related U.S. Appl. No. 15/615,523, Applicant's response to Non-Final Office Action filed Oct. 1, 2018.

Thomas Dawson, Steven Richman, "Multichromic Reflective Layer to Enhance Screen Gain", related U.S. Appl. No. 15/656,495, Examiner's Answer dated Oct. 17, 2018.

Thomas Dawson, Steven Richman, "Multichromic Reflective Layer to Enhance Screen Gain", related U.S. Appl. No. 15/656,495, Reply Brief filed Oct. 24, 2018.

Thomas Dawson, Steven Richman, "Multichromic Reflective Layer to Enhance Screen Gain", related U.S. Appl. No. 15/656,495, Final Office Action dated Jul. 24, 2018.

Thomas Dawson, Steven Richman, "Multichromic Filtering Layer to Enhance Screen Gain", related U.S. Appl. No. 15/656,691, Final Office Action dated Jul. 26, 2018.

Thomas Dawson, Steven Richman, "Multichromic Reflective Layer to Enhance Screen Gain", related U.S. Appl. No. 15/656,495, Applicants response to Non-Final Office Action filed May 21, 2018.

Thomas Dawson, Steven Richman, "Multichromic Reflective Layer to Enhance Screen Gain", related U.S. Appl. No. 15/656,495, Non-Final Office Action dated May 15, 2018.

Steven Richman, Thomas Dawson, Frederick J. Zustak, "Tunable Lenticular Screen to Control Luminosity and Pixel-Based Contrast", related U.S. Appl. No. 15/601,686, Non-Final Office Action dated Jun. 18, 2018.

Steven Richman, Thomas Dawson, Frederick J. Zustak, "Tunable Lenticular Screen to Control Luminosity and Pixel-Based Contrast", related U.S. Appl. No. 15/601,686, Applicant's response to Non-Final Office Action filed Jun. 20, 2018.

Thomas Dawson, Steven Richman, "Multichromic Reflective Layer to Enhance Screen Gain", related U.S. Appl. No. 15/656,495, Applicant's response to Final Office Action filed Aug. 8, 2018.

Thomas Dawson, Steven Richman, "Multichromic Filtering Layer to Enhance Screen Gain", related U.S. Appl. No. 15/656,691, Applicants response to Final Office Action filed Aug. 8, 2018.

Thomas Dawson, Steven Richman, "Multichromic Filtering Layer to Enhance Screen Gain", related U.S. Appl. No. 15/656,691, Non-Final Office Action dated Dec. 13, 2018.

Thomas Dawson, Steven Richman, "Multichromic Filtering Layer to Enhance Screen Gain", related U.S. Appl. No. 15/656,691, Applicant's response to Non-Final Office Action filed Dec. 17, 2018.

Steven Martin Richman, Thomas Dawson, Frederick J. Zustak, "Dual Layer EScreen to Compensate for Ambient Lighting", related U.S. Appl. No. 15/601,758, Non-Final Office Action dated Jan. 19, 2018.

Steven Martin Richman, Thomas Dawson, Frederick J. Zustak, "Dual Layer EScreen to Compensate for Ambient Lighting", related U.S. Appl. No. 15/601,758, Applicant's response to Non-Final Office Action filed Jan. 23, 2018.

(56) References Cited

OTHER PUBLICATIONS

Thomas Dawson, Steven Richman, "Multichromic Reflective Layer to Enhance Screen Gain", related U.S. Appl. No. 15/656,495, Final Office Action dated Jan. 30, 2018.
Thomas Dawson, Steven Richman, "Multichromic Reflective Layer to Enhance Screen Gain", related U.S. Appl. No. 15/656,495, Applicant's response to Final Office Action filed Feb. 1, 2018.
Thomas Dawson, Steven Richman, "Multichromic Filtering Layer to Enhance Screen Gain", related U.S. Appl. No. 15/656,691, Final Office Action dated Jan. 30, 2018.
Thomas Dawson, Steven Richman, "Multichromic Filtering Layer to Enhance Screen Gain", related U.S. Appl. No. 15/656,691, Applicant's response to Final Office Action filed Feb. 1, 2018.
"How to Setup a Projector Screen", EBAY, Mar. 13, 2016. Retrieved from http://www.ebay.com/gds/How-to-Set-Up-a-Projector-Screen-/10000000205290613/g.html.
"Team Develops new, inexpensive transparent projection screen (w/Video)", Phys.Org, Jan. 21, 2014.
"Viewall® Erasable Wall Material", Visual Planning 2015 Corporation, Sep. 15, 2016. Retrieved from http://www.visualplanning.com/boardswallmaterial2.html.
Steven Richman, Thomas Dawson, Frederick J. Zustak, "Tunable Lenticular Screen to Control Luminosity and Pixel-Based Contrast", file history of related U.S. Appl. No. 15/601,686 filed May 22, 2017.
Steven Richman, Thomas Dawson, Frederick J. Zustak, "Dual Layer EScreen to Compensate for Ambient Lighting", file history of related U.S. Appl. No. 15/601,758, filed May 22, 2017.
Thomas Dawson, Steven Richman, "Multichromic Filtering Layer to Enhance Screen Gain", file history of related U.S. Appl. No. 15/656,691, filed Jul. 21, 2017.
Thomas Dawson, Steven Richman, "Multichromic Reflective Layer to Enhance Screen Gain", file history of related U.S. Appl. No. 15/656,495, filed Jul. 21, 2017.
Thomas Dawson, Steven Richman, "Microfaceted Projection Screen", file history of related U.S. Appl. No. 15/615,523, filed Jun. 6, 2017.
Steven Richman, Thomas Dawson, "Tile-Based Lenticular Projection Screen", file history of related U.S. Appl. No. 15/666,247, filed Aug. 1, 2017.
Steven Richman, Thomas Dawson, "Wallpaper-Based Lenticular Projection Screen", file history of related U.S. Appl. No. 15/608,667, filed May 30, 2017.
Thomas Dawson, Steven Richman, "Microfaceted Projection Screen", related U.S. Appl. No. 15/615,523, Final Office Action dated Feb. 5, 2019.
Thomas Dawson, Steven Richman, "Microfaceted Projection Screen", related U.S. Appl. No. 15/615,523, Applicant's response to Final Office Action filed Feb. 11, 2019.
Thomas Dawson, Steven Richman, "Multichromic Filtering Layer to Enhance Screen Gain", related U.S. Appl. No. 15/656,691, Final Office Action dated Feb. 7, 2019.
Steven Richman, Thomas Dawson, "Wallpaper-Based Lenticular Projection Screen", related U.S. Appl. No. 15/608,667, Non-Final Office Action dated Mar. 7, 2019.
Steven Richman, Thomas Dawson, "Wallpaper-Based Lenticular Projection Screen", related U.S. Appl. No. 15/608,667, Applicant's response to Non-Final Office Action filed Mar. 11, 2019.
Steven Richman, Thomas Dawson, "Wallpaper-Based Lenticular Projection Screen", related U.S. Appl. No. 15/608,667, Final Office Action dated Apr. 8, 2019.
Thomas Dawson, Steven Richman, "Multichromic Filtering Layer to Enhance Screen Gain", related U.S. Appl. No. 15/656,691, Examiner's Answer dated Apr. 8, 2019.
Steven Richman, Thomas Dawson, "Tile-Based Lenticular Projection Screen", related U.S. Appl. No. 15/666,247, Non-Final Office Action dated May 3, 2019.
Steven Richman, Thomas Dawson, "Tile-Based Lenticular Projection Screen", related U.S. Appl. No. 15/666,247, Applicant's response to Non-Final Office Action filed May 8, 2019.
Steven Richman, Thomas Dawson, "Wallpaper-Based Lenticular Projection Screen", related U.S. Appl. No. 15/608,667, Applicant's response to Final Office Action filed Apr. 23, 2019.
Thomas Dawson, Steven Richman, "Multichromic Filtering Layer to Enhance Screen Gain", related U.S. Appl. No. 15/656,691, Applicant's Reply Brief in response to the Examiner's Answer filed Apr. 23, 2019.
Steven Richman, Thomas Dawson, "Wallpaper-Based Lenticular Projection Screen", related U.S. Appl. No. 15/608,667, Non-Final Office Action dated Jun. 14, 2019.
Steven Richman, Thomas Dawson, "Wallpaper-Based Lenticular Projection Screen", related U.S. Appl. No. 15/608,667, Applicant's response to Non-Final Office Action filed Jun. 18, 2019.
Thomas Dawson, Steven Richman, "Microfaceted Projection Screen", related U.S. Appl. No. 15/615,523, Non-Final Office Action dated Jun. 11, 2019.
Thomas Dawson, Steven Richman, "Microfaceted Projection Screen", related U.S. Appl. No. 15/615,523, Applicant's response to Non-Final Office Action filed Jun. 12, 2019.
Richman et al., "Tile-Based Lenticular Projection Screen", related U.S. Appl. No. 15/666,247, Applicant's response to Final Office Action filed Aug. 22, 2019.
Richman et al., "Tile-Based Lenticular Projection Screen", related U.S. Appl. No. 15/666,247, Final Office Action dated Aug. 20, 2019.
"20-Pocket Business Card Holder for Wall, Push Dispender, Header, Fits 2000, Black", DISPLAYS2GO website, Aug. 2015, retrieved from https://web.archive.org/web/20150822152559/http://www.displays2go.com/P-14613/Business-card-Dispenser-Can-Make-You-Money?st=Category&sid=4514.
"3D Lenticular Business Cards", 4over4.com, Jul. 2014, retrieved from https://webarchive.org/web/20140729163035/http://www.4over4.com/printing/3d-lenticular-business-cards.
Richman et al., "Tile-Based Lenticular Projection Screen", related U.S. Appl. No. 15/666,247, Applicant's response to Non-Final Office Action filed Oct. 11, 2019.
Richman et al., "Tile-Based Lenticular Projection Screen", related U.S. Appl. No. 15/666,247, Non-Final Office Action dated Oct. 2, 2019.
Richman et al., "Wallpaper-Based Lenticular Projection Screen", related U.S. Appl. No. 15/608,667, Applicant's response to Non-Final Office Action filed Oct. 3, 2019.
Richman et al., "Wallpaper-Based Lenticular Projection Screen", related U.S. Appl. No. 15/608,667, Non-Final Office Action dated Sep. 30, 2019.

\* cited by examiner

FIG. 2  Layering of elements on the window glass. Elements are not shown to scale for illustrative purposes.

TRANSPARENT GLASS OF POLYMER WINDOW PANE AS A PROJECTOR SCREEN

FIELD

The application relates generally to using transparent glass or polymer window panes as projector screens.

BACKGROUND

Projectors such as ultra short throw (UST) projectors are being used to project video onto large screens, making viewing of, for example, TV programming more enjoyable. As understood herein, it would be advantageous as well as entertaining to be able to watch video outside the home or in different rooms using the same projection system as is used to project video onto an interior viewing surface.

SUMMARY

Accordingly, an assembly includes at least one projector screen assembly positionable against a transparent vertically-oriented substrate such as a window. At least one projector is provided to project images onto the projector screen assembly for viewing the images on a side of the substrate opposite to the projector. The projector includes at least one decoder configured for decoding bits of input video from a source of video and sending the bits to at least one buffer in a reverse order such that the bits are read out of the buffer for projection of video onto the projector screen assembly as a mirror image of the input video.

In example embodiments, the projector screen assembly can include at least a first layer diffusing light, with the first layer being translucent. The projector screen assembly can includes at least one lenticular layer. Further, the projector screen assembly may include at least one layer of variable opacity that may be established by a liquid crystal. In non-limiting examples the first layer diffusing light is positionable against the transparent substrate, and the layer of variable opacity is sandwiched between the lenticular layer and the first layer. If desired, a mechanism may be provided for raising and lowering the first layer and/or the lenticular layer, depending on which side of the window the viewer wishes to view the video on.

In another aspect, an assembly includes circuitry that is not a transitory signal and that is configured to receive first input indicating video is to be viewed behind a transparent substrate in front of which a projector is located. The circuitry is configured to, responsive to the first input, reverse an order of decoded bits input to at least one buffer providing input to the projector. The circuitry also is configured to receive second input indicating video is to be viewed on a side of a transparent substrate facing the projector, and responsive to the second input, not reverse an order of decoded bits input to at least one buffer providing input to the projector.

In examples, the circuitry may be configured for, responsive to the first input, controlling at least one of: a lenticular layer, a light diffusing layer so that the at least one of: lenticular layer, light diffusing layer is disposed between the projector and at least one side of the substrate. The circuitry may be further configured for, responsive to the first input, controlling an opacity of at least one liquid crystal disposed between the projector and at least one side of the substrate to be clear. Similarly, the circuitry may be configured for, responsive to the second input, controlling at least one of: a lenticular layer, a light diffusing layer so that the at least one of: lenticular layer, light diffusing layer is not disposed between the projector and at least one side of the substrate while controlling an opacity of at least one liquid crystal disposed between the projector and at least one side of the substrate to be opaque.

In another aspect, a method includes receiving input video and decoding the input video to render bits. The method also includes sending the bits in a reverse order for projection of a mirror image of the input video onto a transparent substrate.

The details of the present application, both as to its structure and operation, can best be understood in reference to the accompanying drawings, in which like reference numerals refer to like parts, and in which:

DETAILED DESCRIPTION

Figure 1:
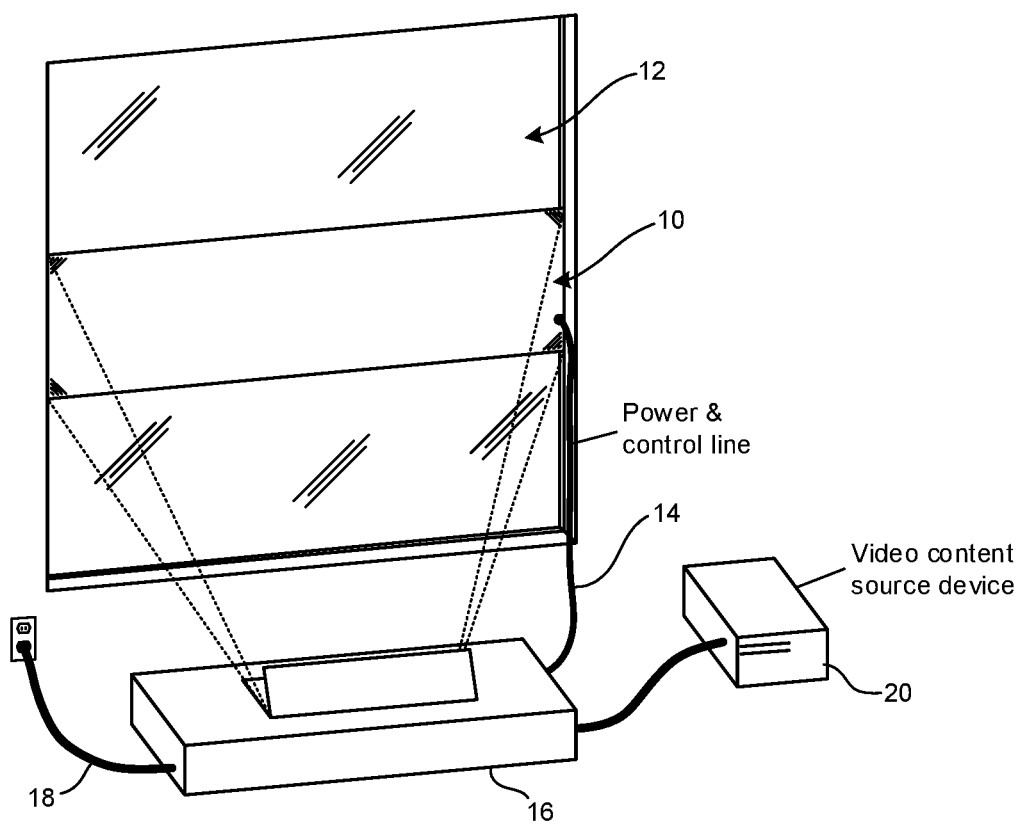
FIG. 1 is a perspective view of an ultra short throw (UST) projector projecting an image backwards onto a transparent window for viewing the image on the side of the window opposite the projector.

This disclosure relates generally to computer ecosystems including aspects of consumer electronics (CE) device networks such as projector systems. A system herein may include server and client components, connected over a network such that data may be exchanged between the client and server components. The client components may include one or more computing devices including video projectors and projector screens, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with one or more general purpose processors, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 2:
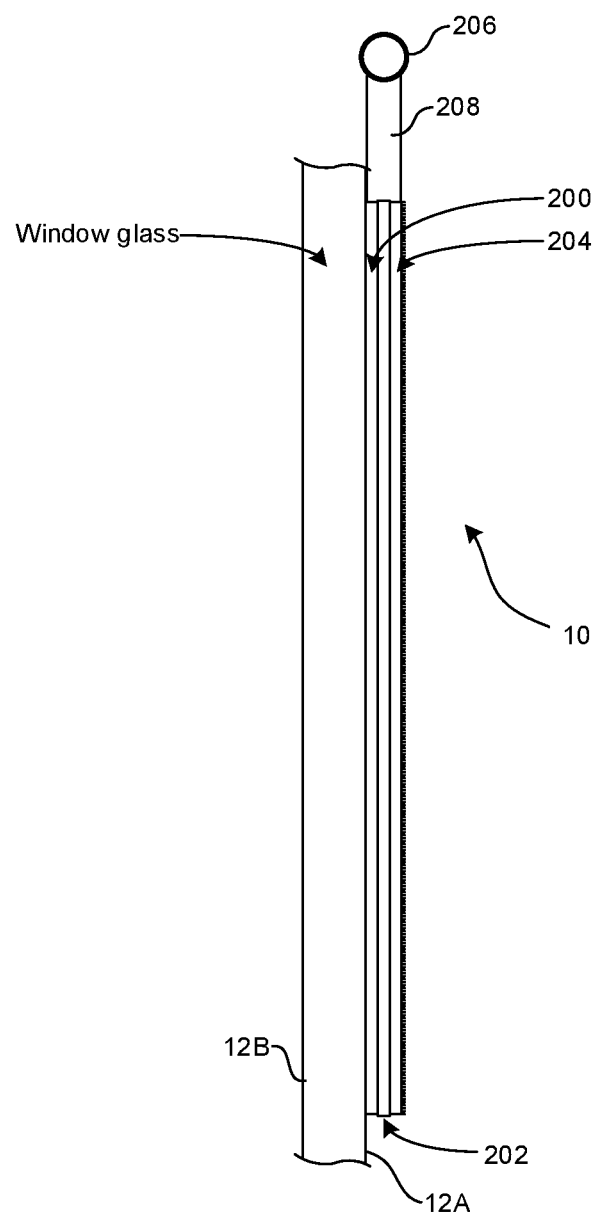
FIG. 2 is a side view of an example window covering assembly shown in FIG. 1.

Now specifically referring to FIGS. 1 and 2, a projector screen assembly 10 is shown disposed against a transparent vertically-oriented substrate such as a window 12. The projector screen assembly 10 can include energizable components discussed further below that may receive power and/or control signals from a wired or wireless link 14 that in the example shown links the assembly 10 with a video projector 16, which may be implemented in non-limiting examples by an ultra short throw (UST) projector. The projector 16 may in turn receive power from a power cord 18.

As described further below, the projector 16 projects images of video received from a source 20 of video. The source 20 may be implemented by one or more of a cable or satellite or other audio video source, such as a separate or integrated set top box, or a satellite receiver. Or, the source 20 may be a game console or personal computer or laptop computer or disk player. Yet again, the source 20 may be cloud servers on the Internet, and may include and perform "cloud" functions such that the devices of the system in FIGS. 1 and 2 may access a "cloud" environment via the source 20 in example embodiments.

Referring specifically to FIG. 2, in the example shown the projector screen assembly 10 may include, from the surface 12A of the substrate 12 that faces the projector 16, a first translucent layer 200 that diffuses light and that is positioned against the transparent substrate 12, a layer 202 of variable opacity placed against the light diffusing layer 200, and a lenticular layer 204 placed against the light diffusing layer 202. A mechanism such as but not limited to a manually operated or motor-driven take up reel 206 may be engaged (via, e.g., cords 208) with one or more of the layers 200, 202, 204 to raise and lower the layers for purposes to be shortly disclosed. While the embodiment illustrated in FIG. 2 shows that the layers can be raised to unblock the window and lowered to block it, the mechanism may alternatively be near the floor, in which case the layers are raised to block the window and lowered to unblock it. Furthermore, in some embodiments one or more of the layers of the projector screen mechanism 10 may be disposed on the surface 12B of the substrate that faces away from the projector.

In example embodiments, the translucent layer 200 may be a lightly glazed sheet of window frosting, to facilitate viewing projected video from the surface 12B that faces away from the projector.

The layer 202 of variable opacity may be established by one or plural liquid crystals that can be activated/deactivated to transition the layer 202 between transparent and opaque states.

The lenticular layer 204 may be established by an array of micro mirrors, an array of liquid crystals, an array of piezoelectric elements, an array of electrochromic elements, and combinations thereof. In some embodiments each element of the lenticular layer may correspond to a respective pixel on the substrate. The elements of the lenticular layer may be individually configured independently of other elements to reflect light in ways described below, or groups of elements may be collectively controlled/configured independently of other groups. In addition or alternatively, the lenticular layer 204 may include any of the grayscale-establishing e-screens set forth in the present assignee's U.S. Pat. No. 9,640,143, incorporated herein by reference.

In some examples, fewer than the three layers 200, 202, 204 shown in FIG. 2 may be used. In an example, the lenticular layer 204 may be applied to the surface 12A of the substrate 12. In another embodiment, the light dispersive or diffusion layer 200 can be disposed between the substrate 12 and the lenticular layer 204. In another embodiment, the lenticular layer 204 can include a light dispersive component so that the light dispersive or diffusion layer 200 can be omitted. In another embodiment the layer 202 of variable opacity may be disposed between the lenticular layer 204 and the transparent substrate 12. In another embodiment the layer 202 of variable opacity may be integral to the lenticular layer 204. In another embodiment the layer 202 of variable opacity can include a liquid crystal that collimates diffused transmitted light.

Figure 3:
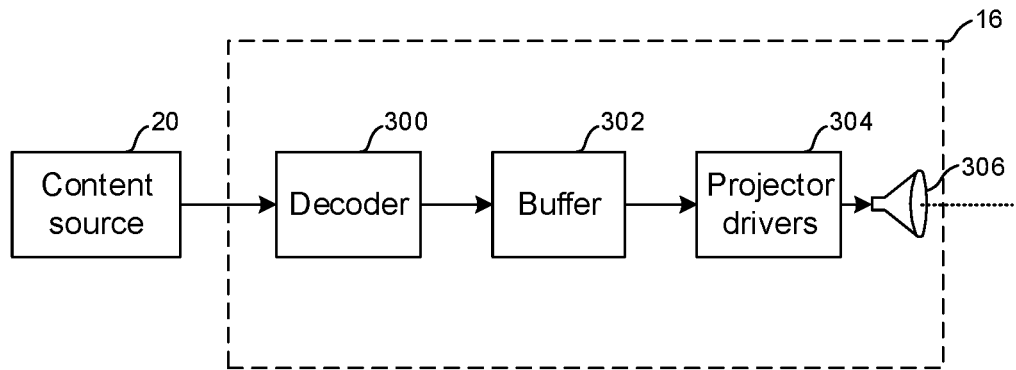
FIG. 3 is a block diagram of an example projector system.

FIG. 3 illustrates an example projector assembly that includes at least one video decoder receiving and decoding bits of input video from the source 20 of video, sending the bits to at least one buffer 302. The buffer 302 may be a line buffer or frame buffer, for example. The bits are output by the buffer 302 typically in a first-in-first-out (FIFO) fashion to the drivers 304 of the projection lamps 306 of the projector 16.

As set forth further below, the decoder 300 may be configured to output the decoded bits in the normal order it would ordinarily output them to the buffer 302 for viewing video from the side 12A of the substrate 12 that faces the projector 16, while changing to output the bits in a reverse order to the buffer such that the bits are read out of the buffer for projection of video onto the projector screen assembly as a mirror image of the input video, for viewing video looking at the surface 12B of the substrate 12 that faces away from the projector.

Thus, video or photos are capable of being seen while integrating both the projector and the transparent pane into the home decor. For example, a UST projector can be used while guests are have a summer event outside (on the side 12B of the substrate 12 when implemented as a window) in the backyard or patio, and they are able to watch a sporting event live, thus adding to the entertainment value of the events. A separate outdoor rated TV is not then required to be purchased.

Preferably, the projector 16 is placed to scale the image horizontally to fit a substrate 12 such as a window adjoining a home exterior area such as a patio or porch. If the video is to be viewed from outside the home the video is shown as a mirror image, with the layer 202 of variable opacity being configured to be transparent. If the video is to be viewed from within the home the layer 202 of variable opacity is configured to be opaque and the video is output from the decoder in the normal order of bits.

Figure 4:
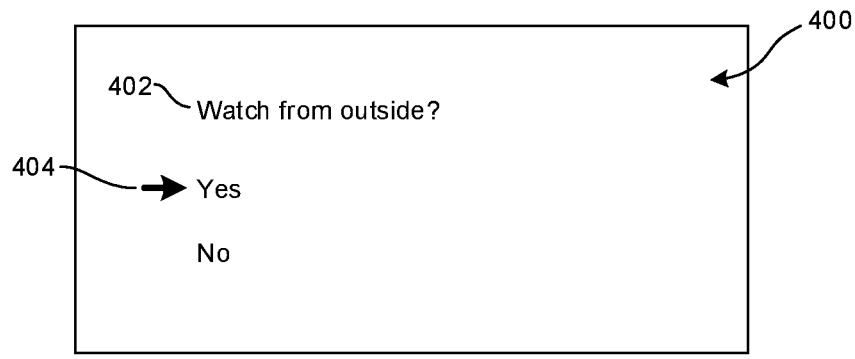
FIG. 4 is a screen shot of an example user interface (UI) enabling a user to select whether to view projected images from the projector side of a window or from the opposing side.
Figure 5:
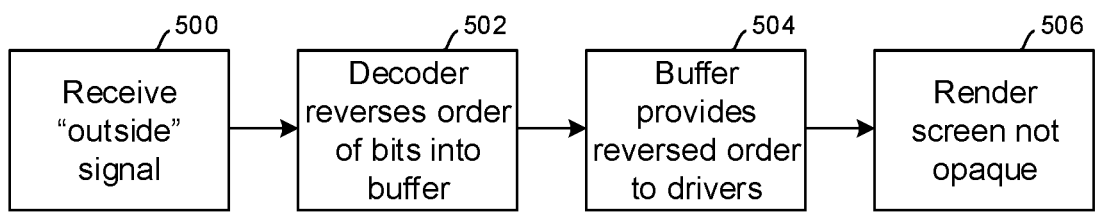
FIGS. 5 and 6 are flow charts of example logic consistent with present principles.
Figure 6:
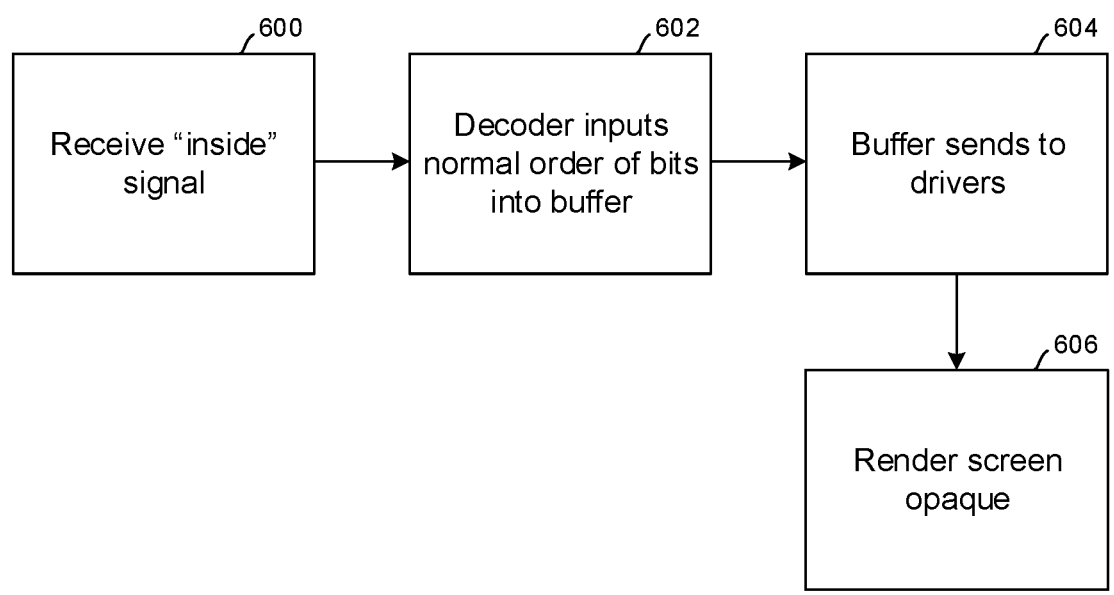

FIGS. 4-6 illustrate operating principles of the projector screen assembly 10 that may be orchestrated by appropriate processing circuitry such as any of the processors and circuitry described herein. In FIG. 4, a user interface (UI) 400 may be presented, e.g., using the projector 16 presenting video on the substrate 12 and/or using a device such as an audio video device or smart phone or other computer. The UI 400 may include a prompt 402 asking whether it is desired to view video on the substrate 12 from inside (looking at the surface 12A facing the projector) or outside (looking at the surface 12B facing away from the projector). Selectors 404 may be selected using an appropriate input device such as a remote control (RC) or touchscreen or other device to select the side of the substrate from which it is desired to view video from the projector 16.

Turning to FIG. 5, responsive to receiving input at block 500 indicating video is to be viewed behind the transparent substrate 12, i.e., from the surface 12B facing away from the projector 16, the order of decoded bits input from the decoder 300 to the buffer 302 is reversed from the normal order, by, for example, first reading out the bits from the decoder from the portion of the frame that normally is last read out, maintaining the sequence of bits read out the same except for the reversal of the order in which they are read out. The bits in reverse order are provided to the projector drivers at block 504.

Moving to block 506, the light diffusing layer 200 may be controlled so that the layer is disposed between the projector 16 and the substrate 12, as shown to be in FIG. 2. To this end, the reel 206 may be appropriately activated.

If desired, the lenticular layer 204 may be removed from being between the substrate and projector. Also, the layer 202 of variable opacity is controlled to be clear.

On the other hand and referring now to FIG. 6, responsive to receiving input at block 600 indicating video is to be viewed in front of the transparent substrate 12, i.e., from the surface 12A facing the projector 16, the order of decoded bits input from the decoder 300 to the buffer 302 is read out at block 602 to the buffer in the normal order. Specifically, by "normal order" is the order the bits would be read out to a projector projecting images against a wall or projector screen, as is typically the case for front projection systems. At block 604 the buffer sends the bits to the projector driver(s).

Proceeding to block 606, the lenticular layer 204 is controlled so that the layer is disposed between the projector 16 and the substrate 12 as shown in FIG. 2. If desired, the light diffusing layer 200 may be removed from being between the projector and substrate. Also, the layer 202 of variable opacity is controlled to be opaque.

Figure 7:
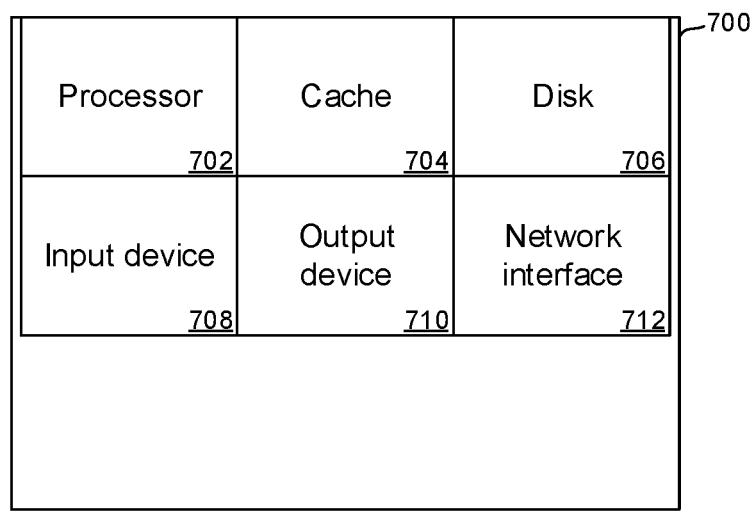
FIG. 7 is a block diagram of an example computing device that may be implemented by any of the present controllers/projectors/video sources.

FIG. 7 illustrates a computer 700 as may be implemented by ant appropriate component herein, including the projectors, controllers, video sources, etc. One or more processors 702 typically access one or more computer storages such as solid state cache 704 and/or disk-based storage 706 to execute logic herein. The processor 702 may receive input from one or more input devices 708 and generate output for one or more output devices 710, such as projector lamps. One or more network interfaces 712 may provide communication connectivity between the processor 702 and external devices.

Other output devices may include video displays, audio speakers, printers, network devices. Network interfaces may include Wi-Fi transceivers, a wired or wireless modem or router, a wireless telephony transceiver, a Bluetooth transceiver, a USB port. Input devices may include microphones, cameras, motion sensors, mice, keypads, keyboards, and the like.

The above methods may be implemented as software instructions executed by a processor, including suitably configured application specific integrated circuits (ASIC) or field programmable gate array (FPGA) modules, or any other convenient manner as would be appreciated by those skilled in those art. Where employed, the software instructions may be embodied in a device such as a CD Rom or Flash drive or any of the above non-limiting examples of computer memories that are not transitory signals. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. An assembly, comprising:
   circuitry that is not a transitory signal and that is configured to:
   receive first input indicating video is to be viewed behind a transparent substrate in front of which a projector is located;
   responsive to the first input, reverse an order of decoded bits input to at least one buffer providing input to the projector;

receive second input indicating video is to be viewed on a side of a transparent substrate facing the projector; and responsive to the second input, not reverse an order of decoded bits input to at least one buffer providing input to the projector.

2. The assembly of claim 1, wherein the circuitry is configured for:

responsive to the first input, controlling at least a light diffusing layer so that the light diffusing layer is disposed between the projector and at least one side of the substrate.

3. The assembly of claim 1, wherein the circuitry is configured for:

responsive to the first input, controlling an opacity of at least one liquid crystal disposed between the projector and at least one side of the substrate to be clear.

4. The assembly of claim 1, wherein the circuitry is configured for:

responsive to the second input, controlling at least one of: a lenticular layer, a light diffusing layer so that the at least one of: lenticular layer, light diffusing layer is disposed between the projector and at least one side of the substrate.

5. The assembly of claim 1, wherein the circuitry is configured for:

responsive to the second input, controlling an opacity of at least one liquid crystal disposed between the projector and at least one side of the substrate to be opaque.

* * * * *